Patented Dec. 6, 1938

2,139,364

UNITED STATES PATENT OFFICE 2,139,364

ALPHA-SUBSTITUTED GLYCEROL NITRATES

Herbert P. A. Groll, Berkeley, Calif., assignor to Shell Development Company, San Francisco, Calif., a corporation of Delaware No Drawing. Application March 22, 1937, Serial No. 132,345

14 Claims. (Cl. 52—5)

This invention relates to the production of valuable nitrates of alpha-substituted glycerols, and it provides a practical process for the preparation of such alpha-substituted mono-, di- or tri-nitrates which comprises reacting an alpha-substituted glycerol of the general formula R—CHOH—CHOH—CHOH—$R_1$, wherein R is an organic radical and $R_1$ is a hydrogen atom or an organic radical, with a nitrating agent.

The invention also relates to novel and valuable nitrates of alpha-substituted glycerols, which alpha-substituted glycerol nitrates are useful for a wide variety of commercial purposes. They are in general useful as explosives and as components of explosive mixtures and compositions, as proknocks or knock-inducers for use in motor fuels such as Diesel oils, etc., as solvents, and as reagents in a variety of commercial processes. The novel nitrated alpha-substituted glycerols to which the invention relates may for convenience be represented by the general formula

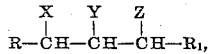

wherein R is an organic radical, $R_1$ is a hydrogen atom or an organic radical, and X, Y and Z are nitrate radicals or hydroxyl groups, it being understood that at least one of the radicals represented by X, Y or Z is a nitrate radical. When X, Y and Z all represent a nitrate radical, the compound is an alpha-substituted glycerol trinitrate. The lower molecular weight alpha-substituted glycerol trinitrates are particularly useful as explosives and as components of explosive mixtures.

The invention also relates to novel explosive compositions comprising a nitrated alpha-substituted glycerol of the general formula

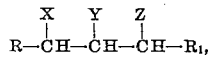

wherein R is an organic radical, $R_1$ is a hydrogen atom or an organic radical, and X, Y and Z are nitrate radicals or hydroxyl radicals, at least one of them being a nitrate radical; and the invention more particularly relates to explosives and explosive compositions consisting of or comprising an alpha-substituted glycerol trinitrate of the above-noted general formula wherein, X, Y and Z are all nitrate radicals. The alpha-substituted glycerol trinitrates, particularly the lower alpha-alkyl- and alpha, alpha'-dialkyl glycerol trinitrates as alpha-methyl glycerol trinitrate, alpha, alpha'-dimethyl glycerol trinitrate, alpha-ethyl glycerol trinitrate, etc. are in themselves explosives of practicable stability and low volatility, but they are particularly valuable as components of explosive mixtures. They may be used, for example, as ingredients in the manufacture of smokeless powders, safety explosives, blasting powders, dynamite and the like. They are particularly useful as freezing point depressors for nitroglycerol. Dissolved in nitro-glycerol the freezing point of the resulting mixture is considerably below that of the pure nitroglycerol. For this purpose, the alpha-substituted glycerol trinitrates are superior in many respects to agents, such as the glycol dinitrates, now used. They have a relatively much lower vapor pressure than the glycol dinitrates and they can accordingly be handled with less danger of irritation and poisoning caused by the noxious vapors of organic nitrates. Another valuable feature of such a mixture is that a more favorable oxygen-carbon hydrogen mixture can be obtained by regulating the relative proportions of the nitroglycerol and alpha-substituted glycerol trinitrate, resulting in an explosive mixture from which the actual power developed is greater than that derivable from an equivalent quantity of pure nitroglycerol. This can be explained by the resulting mixture having an exactly balanced composition, the products of explosion being $CO_2$ $H_2O$ and $N_2$, whereas, in the case of nitroglycerol alone, there results from the explosion free oxygen (about 3.5% excess) and consequently less power. Another valuable feature of the above-described mixtures may reside in their decreased sensitivity to friction and shock.

The new explosives herein described may be used alone or in admixture with nitroglycerol and/or the glycol dinitrates in the preparation of dynamite. For this purpose, they may be incorporated with any of the known absorbents used for the manufacture of dynamite from nitroglycerol alone and nitroglycerolglycol dinitrate mixtures. The new explosives may also be used in admixture with inorganic nitrates, inorganic nitrites, organic nitrates as the diglycol polynitrates, the diglycerol polynitrates, the alkylol-cycloalkyanol polynitrates, the erythritol polynitrates, the nitrated sugars, the nitrated starches, nitrocellulose, etc., the organic nitrites as the mono- and poly-hydric alcohol nitrites, nitro isobutyl glycerol trinitrate, trinitrobenzene, trinitrotoluol, trinitrotoluol oils, and the like. For example, the new explosives may be used in the manufacture of smokeless powder propellants by causing it, alone or in admixture with nitroglycerol and/or a glycol dinitrate, to dissolve nitrocellulose or its equivalent, such as amylose nitrate or any of the nitro-saccharoses, with or without the assistance of another solvent such as a ketone, alcohol, ether and the like or a mixture of such solvents.

The alpha-substituted glycerols which may be converted to valuable nitrated alpha-substituted glycerols in accordance with the invention are conveniently represented by the general formula R—CHOH—CHOH—CHOH—$R_1$, wherein R is an organic radical and $R_1$ is a hydrogen atom or an organic radical. In a preferred subgroup of alpha-substituted glycerols, R represents a hydrocarbon radical and $R_1$ represents a hydrogen atom or a hydrocarbon radical. R and $R_1$ may represent the same or different alkyl, alkenyl, aralkyl, aralkenyl, alicyclic or aryl radicals. When R and $R_1$ represent organic radicals, the hydrocarbon radicals, such as those above-recited, may be substituted by suitable inorganic or organic substituents such as alkoxy groups, halogen atoms, amino groups, carbonyl groups, etc.

A preferred group of alpha-substituted glycerols embraces those of the general formula R—CHOH—CHOH—CHOH—$R_1$, wherein R is an alkyl radical and $R_1$ is a hydrogen atom or an alkyl radical. The alkyl radicals represented by R and $R_1$ may be of straight chain, branched chain or alicyclic character. For example, R (and $R_1$ when it represents an alkyl radical) may be an alkyl radical as methyl, ethyl, propyl, isopropyl, butyl, isobutyl, tertiary butyl, cyclobutyl, cyclopentyl, cyclohexyl and the like. When both R and $R_1$ represent alkyl radicals, the compound is an alpha, alpha'-dialkyl glycerol such as the compound of the formula $$CH_3—CHOH—CHOH—CHOH—CH_3.$$

When $R_1$ represents a hydrogen atom, the compound is an alpha-alkyl glycerol of which alpha-methyl glycerol ($CH_3$—CHOH—CHOH—$CH_2OH$) is representative.

The following are representative alpha-substituted glycerols which may be converted to valuable nitrated alpha-substituted glycerols in accordance with the process of the invention:

$CH_3$—CHOH—CHOH—$CH_2OH$ $(CH_3)_2CH$—CHOH—CHOH—$CH_2OH$

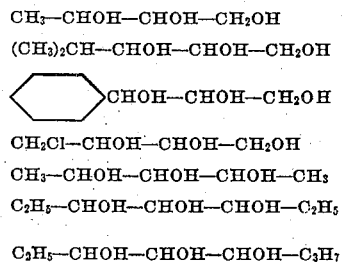

$CH_2Cl$—CHOH—CHOH—$CH_2OH$ $CH_3$—CHOH—CHOH—CHOH—$CH_3$ $C_2H_5$—CHOH—CHOH—CHOH—$C_2H_5$ $C_3H_5$—CHOH—CHOH—CHOH—$C_3H_7$ and the like and their homologues, analogues and suitable substitution products.

The nitration of the alpha-substituted glycerols is effected by causing them to react with a suitable nitrating agent. A preferably employed nitrating agent is a nitrating acid comprising concentrated nitric and sulphuric acids. The proportions of the acids in the nitrating acid mixture may vary within a wide range of values depending upon the material nitrated, the conditions of nitration, the particular nitrate or nitrates desired, etc. Nitrating acid mixtures containing from about 30% to about 45% by weight of nitric acid, about 45% to about 65% by weight of sulphuric acid, and from about 2% to about 10% by weight of water are in general suitable. When the invention is executed to obtain predominantly the trinitrate of the glycerol reacted, the relative amounts of the glycerol and the nitrating acid are preferably computed so that the nitrating acid contains an excess of nitric acid over the theoretical amount required to completely nitrate the glycerol.

The nitration may be effected by contacting the alpha-substituted glycerol with the nitrating acid at temperatures below about room temperature and preferably in the temperature range of from about $-10°$ C. to about $+10°$ C. It is, however, to be understood that higher or lower temperatures may, in some cases, be advantageously employed. The nitration may be effected in any suitable type of apparatus. A preferred reaction vessel is one provided with efficient cooling means so that the reaction temperature may be accurately controlled, and provided with mechanical stirring means so that intimate contact of the reactants can be effected by stirring. As an example of a suitable mode of executing the process of the invention, I may take as the nitrating mixture a nitrating acid containing about 37% $HNO_3$, 59% $H_2SO_4$ and 4% water. This mixture may be cooled to a temperature below 20° C., a temperature of about 0° C. being desirable. The cooled acid mixture is vigorously stirred while the alpha-substituted glycerol is added slowly, in small quantities at a time, with constant agitation until the required amount has been added. When the reaction has proceeded to the desired extent, the product or products may be separated from the acid mixture and purified, if desired, by any of the methods known to the art. The process is adapted to a batch or continuous mode of execution.

A mixture of different species of alpha-substituted glycerols may be treated and a mixture of the resulting nitrates obtained. If desired a mixture comprising one or more alpha-substituted glycerols and one or more other polyhydric alcohols as glycerol, the glycols, polyglycols, polyglycerols, etc., may be nitrated and a novel mixture of the resulting nitrates obtained. Such nitrate mixtures are, in many cases, valuable explosive compositions of low freezing point.

$C_2H_5$—CHOH—CHOH—$CH_2OH$ $C_4H_9$—CHOH—CHOH—$CH_2OH$

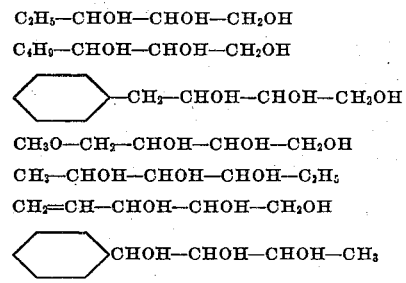

$CH_3O$—$CH_2$—CHOH—CHOH—$CH_2OH$ $CH_3$—CHOH—CHOH—CHOH—$C_2H_5$ $CH_2$=CH—CHOH—CHOH—$CH_2OH$

The following specific example illustrates a suitable mode of executing the invention to obtain a novel and useful alpha-substituted glycerol trinitrate. It is to be understood that the example is introduced for purposes of illustration only and that the invention is not to be regarded as limited to the specific reactants, conditions or modes of operation therein described.

*Example*

The apparatus consisted of a glass reaction vessel equipped with a stop-cock at the bottom, a thermometer for measuring the temperature of its contents during reaction, and a motor-driven stirrer for effecting intimate mixing of its contents. The stirrer was made of glass and rotated in a glass bearing to which was attached a glass tube for the introduction of the alpha-methyl glycerol to the reaction vessel. The alpha-methyl glycerol served as a lubricant and was dispersed into the acid mixture at the lower end of the bearing which was kept above the surface of the acid mixture. Cooling was effected by immersing the reaction vessel into a bath of circulating brine maintained at a temperature of from about $-9°$ C. to $-6°$ C.

A nitrating acid containing about 37% by weight of nitric acid, about 59% by weight of sulphuric acid, and about 4% by weight of water was used. This mixture was cooled and stirred while about 75% of the stoichiometrical amount of alpha-methyl glycerol $$CH_3CHOH-CHOH-CH_2OH$$

was added thereto slowly over a period of about 30 minutes, the temperature of the mixture being kept at about $0°$ C. ($-5°$ C. to $+2°$ C.). When all of the alpha-methyl glycerol had been added, the reaction mixture was run into a beaker of cracked ice. After the ice had melted, the heavy yellow liquid product was separated from the aqueous acid solution and washed twice with an aqueous 3% solution of sodium carbonate and then with distilled water at room temperature. The washed product was dried over anhydrous calcium chloride in a desiccator.

The product, which was obtained in an almost quantitative yield, was the pure trinitrate of alpha-methyl glycerol of the formula $$CH_3-CH(NO_3)-CH(NO_3)-CH_2(NO_3)$$

This compound is a clear, slightly yellow liquid having a specific gravity ($D_4^{20}$) of 1.489. It has a low freezing point. It did not crystallize even when kept at temperatures of from $-65°$ C. to $-10°$ C. for long periods of time.

The novel compound, alpha-methyl glycerol trinitrate, is an excellent explosive. It has valuable explosive properties by itself or in admixture with a wide variety of other bodies such as are commonly used in the manufacture of explosives. Either alone or in admixture with nitroglycerol, it may be used in substantially all of the explosives in which nitroglycerol is now used.

When added to nitroglycerol, alpha-methyl glycerol trinitrate materially lowers the freezing point of the mixture. Thus, it is seen that alpha-methyl glycerol trinitrate possesses the desirable property of giving a powerful explosive composition which resists freezing to a much greater extent than the explosives made with nitroglycerol alone. Numerous advantages are inherent in the use of alpha-methyl glycerol trinitrate over the ethylene glycol dinitrate now used for this purpose. It has a relatively much higher vapor pressure than glycol dinitrate and it can be used and handled with less danger due to irritation and poisoning caused by the noxious organic nitrate vapors. Mixtures of alpha-methyl glycerol trinitrate result in an explosive from which the power developed is greater than that derivable from an equivalent quantity of nitroglycerol alone. When added to nitroglycerol in the ratio of about 17.5 parts by weight of alpha-methyl glycerol to about 82.5 parts by weight of nitroglycerin, the freezing point is not only depressed but the actual power developed by this mixture is considerably greater than that developed by an equivalent quantity of pure nitroglycerol. This can be explained by the mixture having an exactly balanced composition, the products of explosion being $CO_2$, $H_2O$ and $N_2$, whereas, in the explosion of trinitroglycerol alone there results from the explosion free oxygen, and consequently less power.

While I have described my invention in a detailed manner and provided an example illustrating a suitable mode of executing the same, it is to be understood that modifications may be made and that no limitations other than those imposed by the scope of the appended claims are intended.

I claim as my invention:

1. A nitrated alpha-substituted glycerol of the general formula $$\begin{array}{ccc} X & Y & Z \\ | & | & | \\ R-CH-CH-CH-R_1, \end{array}$$

wherein R is a hydrocarbon radical, $R_1$ is a substituent of the group consisting of the hydrogen atom and hydrocarbon radicals, and X, Y and Z are radicals of the group consisting of the nitrate radical and the hydroxyl radical, at least one of them being a nitrate radical.

2. A nitrated alpha-substituted glycerol of the general formula $$\begin{array}{ccc} X & Y & Z \\ | & | & | \\ R-CH-CH-CH-R_1, \end{array}$$

wherein R and $R_1$ are hydrocarbon radicals, and X, Y and Z are radicals of the group consisting of the nitrate radical and the hydroxyl radical, at least one of them being a nitrate radical.

3. A nitrated alpha-substituted glycerol of the general formula $$\begin{array}{ccc} X & Y & Z \\ | & | & | \\ R-CH-CH-CH_2, \end{array}$$

wherein R is a hydrocarbon radical and X, Y and Z are radicals of the group consisting of the nitrate radical and the hydroxyl radical, at least one of them being a nitrate radical.

4. A nitrated alpha-alkyl glycerol.

5. A nitrated alpha-methyl glycerol.

6. The alpha-substituted glycerol trinitrate of the general formula $$R-CHNO_3-CHNO_3-CHNO_3-R_1,$$

wherein R and $R_1$ are hydrocarbon radicals.

7. The alpha-alkyl glycerol trinitrate of the general formula $$R-CHNO_3-CHNO_3-CH_2NO_3,$$

wherein R is an alkyl radical.

8. Alpha-methyl glycerol trinitrate.

9. An explosive composition comprising an alpha-alkyl glycerol trinitrate.

10. An explosive composition comprising alpha-methyl glycerol trinitrate.

11. An explosive composition comprising alpha-methyl glycerol trinitrate and nitroglycerin.

12. An explosive composition consisting of alpha-methyl glycerol trinitrate and nitroglycerin.

13. A nitrated alpha, alpha'-dialkyl glycerol.

14. A nitrated alpha, alpha'-dimethyl glycerol.

HERBERT P. A. GROLL.